United States Patent [19]

Keyes

[11] 4,347,863

[45] Sep. 7, 1982

[54] COMBINED SAFETY VENT AND SIPHON UNLOADING NOZZLE FOR LIQUID TRANSPORTATION VEHICLE

[75] Inventor: John T. Keyes, Greenville, S.C.

[73] Assignee: Union Tank Car Company, East Chicago, Ind.

[21] Appl. No.: 815,481

[22] Filed: Jul. 14, 1977

[51] Int. Cl.³ .............................................. B67D 5/54
[52] U.S. Cl. .................................... 137/212; 105/358;
   137/207; 137/347; 137/587; 137/590
[58] Field of Search ........................ 105/355, 358, 360;
   280/5 R, 5 C, 5 D, 5 E; 220/20, 86 R, 89 A,
   203, 207, 374; 137/587, 589, 207, 212, 347, 590

[56] References Cited

U.S. PATENT DOCUMENTS

| | | | |
|---|---|---|---|
| 2,102,124 | 12/1937 | Lithgow | 105/358 |
| 2,290,038 | 7/1942 | Folmsbee | 105/358 X |
| 2,675,682 | 4/1954 | Dobson | 280/5 D X |
| 3,310,197 | 3/1967 | Folmsbee et al. | 220/89 A |
| 3,435,984 | 4/1969 | Damiani | 220/89 A |
| 3,472,420 | 10/1969 | Hiatt | 220/89 A |
| 3,520,443 | 7/1970 | Selby, Jr. | 220/89 A |
| 3,598,277 | 8/1971 | Adelman | 220/89 A X |
| 3,845,876 | 11/1974 | Needham | 220/203 |
| 3,845,878 | 11/1974 | Carlson | 220/89 A |

FOREIGN PATENT DOCUMENTS 945818  4/1974  Canada .............................. 105/358

*Primary Examiner*—Randolph A. Reese
*Attorney, Agent, or Firm*—Dressler, Goldsmith, Shore, Sutker & Milnamow, Ltd.

[57] ABSTRACT

A vehicle for transporting a liquid commodity has a combined frangible disc safety vent and siphon unloading pipe nozzle. The siphon unloading pipe passes through a hole in the vehicle that is surrounded by the nozzle side wall. The hole is dimensioned to enable the nozzle to act as a surge chamber that dissipates transient pressure surges and thereby prevents premature breaking of the frangible safety vent disc.

3 Claims, 2 Drawing Figures

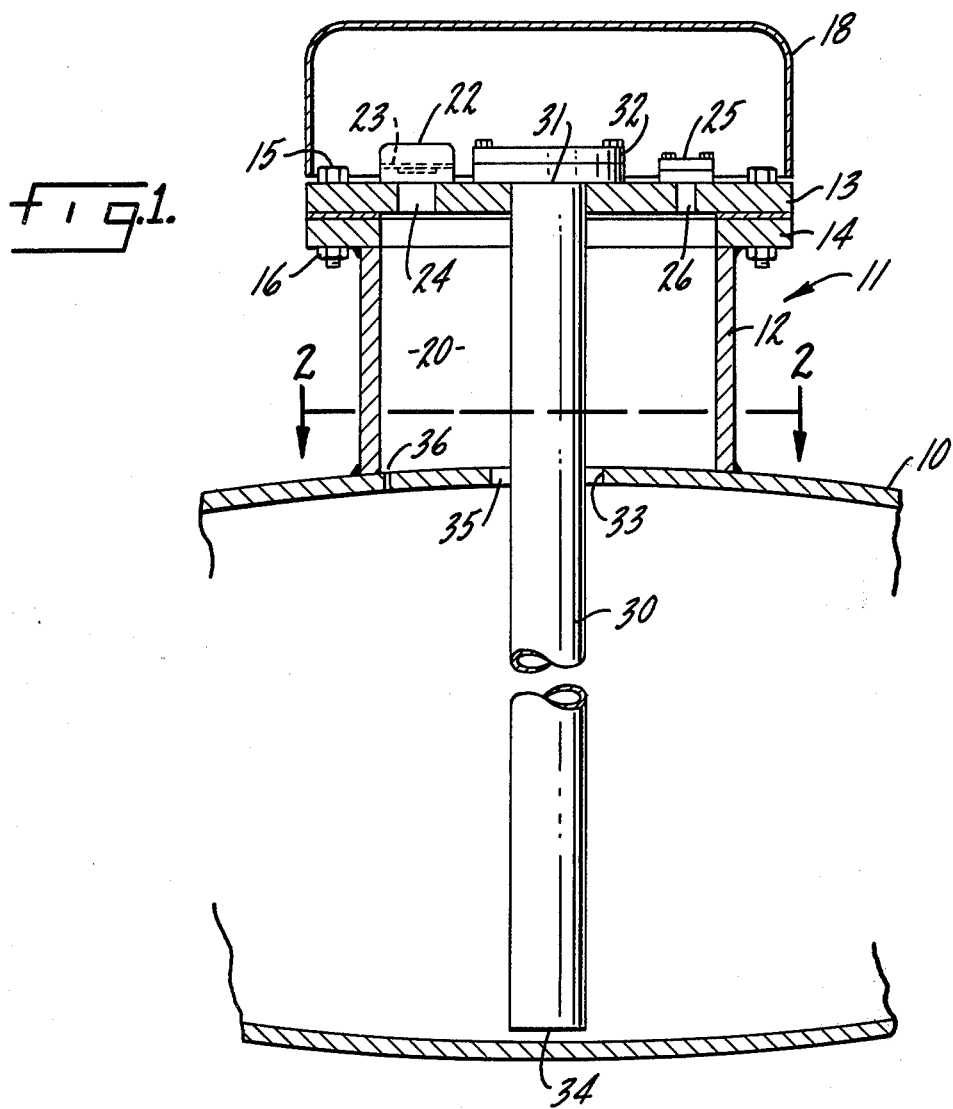
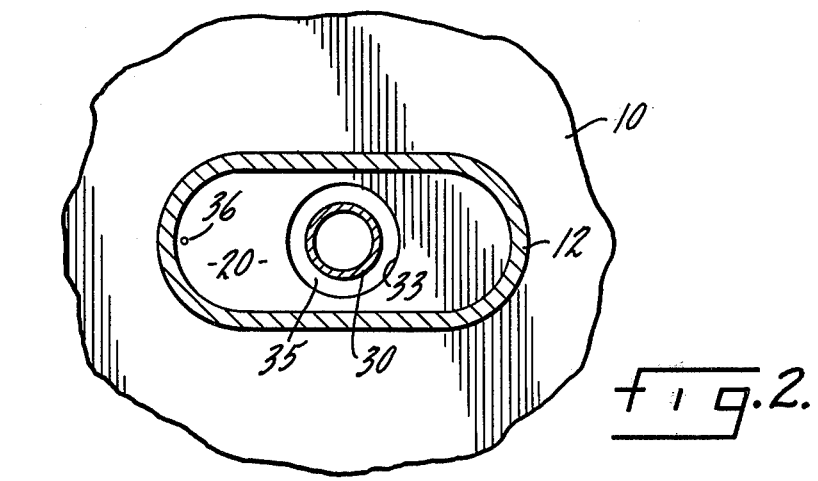

COMBINED SAFETY VENT AND SIPHON UNLOADING NOZZLE FOR LIQUID TRANSPORTATION VEHICLE

BACKGROUND OF THE INVENTION

This invention relates to nozzles for discharging liquid commodities and relieving excess pressure from liquid transporting vehicles, and more particularly to a combined safety vent and siphon unloading nozzle for railroad tank cars.

Liquid being transported in a vehicle may surge toward its end when the vehicle starts, stops or changes direction or speed suddenly. The surging liquid may locally trap and compress gas in the vehicle and thus cause a localized transient increase in pressure (e.g. 120 p.s.i. for 2.5 mili-seconds); the pressure quickly returns to normal as the surge subsides. Such vehicles frequently have safety vents with frangible discs for relieving excess pressure. It is highly undesirable for such discs to be broken by normal transient pressure surges because the broken disc must be replaced immediately or else the liquid will leak from the vehicle or become contaminated. Surge chambers have been used in conjunction with frangible discs for dissipating transient pressure surges without breaking the discs. However, such prior surge chambers have required single-purpose nozzles for communicating with the vehicle interior, and have increased the number of protrusions on such vehicles. Also, such prior surge chambers are often difficult to clean or line with a corrosion resistant coating.

Accordingly, it is an object of this invention to provide an improved transient pressure surge chamber for vehicles which transport liquids.

Another object is to provide a multi-purpose nozzle for railroad tank cars.

Another object is to provide a vehicle with a siphon unloading nozzle that serves the additional function of being the surge chamber for preventing premature rupture of a frangible element safety vent.

Another object is to reduce the number of holes through and protrusions from the skin of a railroad tank car.

Another object is to provide a safety vent surge chamber which is readily accessible for cleaning and lining.

Another object is to provide a railroad tank car combined siphon unloading and safety vent nozzle which is rugged, durable, relatively low cost, easily maintained, and which does not possess defects found in similar prior art devices.

Other objects and advantages of the invention will be found in the specification and claims, and the scope of the invention will be pointed out in the claims.

DESCRIPTION OF THE DRAWING

FIG. 1 is a schematic, cross-sectional, partially broken away view of a preferred embodiment of the invention.

FIG. 2 is a cross-sectional view taken along the line 2—2 of FIG. 1.

DESCRIPTION OF THE INVENTION

The drawing shows a portion of a closed cylindrical metal tank 10 of a conventional railroad tank car for transporting a liquid commodity, such as phosphoric acid. Standard rail car components such as draft gear, wheels, and a liquid inlet nozzle have been omitted to simplify the drawing.

An oblong, round siphon unloading nozzle 11 is welded to the outside surface at the top of tank 10. An open-ended side wall 12 of the nozzle extends above tank 10 and a generally horizontal cover plate 13 spans and closes the open end. A horizontal flange 14 extends around side wall 12 and bolts 15 threaded into nuts 16 pass through aligned holes in plate 13 and flange 14 for removably holding plate 13 in place. A removable weather cover 18 may be attached to plate 13 in any conventional manner. Side wall 12, cover plate 13 and the top surface of tank 10 surrounded by side wall 12 define a pressure dissipating closed surge chamber 20 on the outside of tank 10.

A conventional pressure or vacuum safety vent 22, including a replaceable frangible disc 23, is mounted on plate 13 and communicates with surge chamber 20 through a hole 24. A conventional pressure inlet fitting 25 for connection to a source of pressurized air may also be mounted on plate 13 to communicate with surge chamber 20 through a hole 26.

A unitary siphon unloading pipe 30 having a predetermined outside diameter is mounted at its upper end 31 in cover plate 13. Removable lid means 32 closes upper end 31. Siphon unloading pipe 30 extends through chamber 20 and passes through a hole 33 in the top surface of tank 10 that is surrounded by side wall 12. Pipe 30 continues into tank 10 and its lower end 34 terminates adjacent (e.g., one inch above) the inside bottom surface of tank 10.

Hole 33 has a predetermined diameter slightly larger than the outside diameter of siphon unloading pipe 30. Thus hole 33 is the means by which the interior of nozzle 11 and the interior of tank 10 communicate, and hole 33 defines an annular surge pressure transmitting opening 35 around the outside of siphon pipe 30. The area of opening 35 should be related to the volume of chamber 20 so that the transient pressure surges encountered in any particular railroad tank car will be dissipated in chamber 20 without causing premature rupture of frangible disc 23. For example, in a 20,000 gallon tank car with a siphon pipe 30 having an outside diameter of 2.375 inches, surge chamber 20 could have a volume of about 791 cubic inches, and hole 33 could have a diameter of 3.875 inches. This would result in surge pressure transmitting opening 35 having an area of 7.363 inches, and would prevent premature rupture of a two inch frangible disc 23 designed to break at 70-75 p.s.i. A small diameter hole 36 (e.g. one-half inch) may be drilled through the skin of tank 10 adjacent wall 12 to drain liquid trapped in nozzle 11. The area of such hole 36, if not insignificant, should be subtracted from that of opening 35 so that the total open area maintains the proper relationship to the volume of chamber 20.

To unload a liquid commodity from tank 10 through siphon pipe 30, lid 32 is removed from upper end 31 and a conventional liquid conduit is connected thereto. A source of pressurized air should then be connected to pressure inlet fitting 25 until the contents of tank 10 are forced out through siphon pipe 30.

It has thus been shown that by the practice of this invention a railroad tank car need have only one nozzle 11 to accomplish both siphon unloading and to prevent premature fracture of safety vent disc 23. The normally open interior of nozzle 11 is closed off except for hole 33 which defines annular surge pressure transmitting opening 35 around the outside of siphon pipe 30. This enables the interior of nozzle 11 to function as surge chamber 20 on the outside of tank 11 for dissipating transient pressure surges that would otherwise break disc 23. Also, the reduced hole size in tank 10 reduces stresses and the amount of reinforcement required in the nozzle area. The interior of chamber 20 is easily accessible for cleaning or lining repair by removal of bolts 15 and plate 13.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A vehicle for transporting a liquid commodity comprising:
   (a) a closed tank for containing such liquid commodity;
   (b) a combined safety vent and siphon unloading nozzle mounted on the top outside surface of said tank having an open-ended upstanding side wall extending above said tank and a generally horizontal coverplate spanning the open end, said side wall, cover plate and top surface defining a closed surge chamber on the outside of said tank that communicates with the inside of said tank through a hole in said top surface;
   (c) a safety vent including a replaceable frangible element mounted on said cover plate and communicating with said closed chamber through said cover plate;
   (d) a siphon unloading pipe of predetermined outside diameter having its upper end mounted in said cover plate and means closing said pipe upper end, said siphon pipe extending downwardly through said closed chamber and continuing through said hole in said top surface and into the inside of said closed tank, the lower end of said siphon pipe terminating adjacent the bottom of said closed tank;
   (e) said hole having a predetermined diameter slightly larger than said outside diameter of said siphon pipe so as to define an annular surge pressure transmitting opening around said siphon pipe for dissipating transient surge pressure of said tank into said chamber without causing premature rupture of said frangible element, and
   (f) said liquid commodity being unloaded from said tank through said siphon pipe by opening said means closing the upper end of said siphon pipe and connecting a source of pressurized air to air pressure inlet means for said tank.

2. The invention defined in claim 1, further comprising a drain hole of relatively small diameter passing through said tank within said surge chamber immediately adjacent said wall.

3. A vehicle for transporting a liquid commodity comprising:
   (a) a closed cylindrical tank for containing such liquid commodity;
   (b) a combined safety vent and siphon unloading nozzle mounted on the top outside surface of said tank having an open-ended upstanding side wall extending above said tank and a generally horizontal coverplate spanning the open end, a horizontal flange extending around said side wall and said cover plate being removably attached to said flange by bolts passing therethrough, said side wall, cover plate and top surface defining a closed surge chamber on the outside of said tank that communicates with the inside of said tank through a hole in said top surface;
   (c) a safety vent including a replaceable frangible element and a pressure inlet fitting for a source of pressurized air mounted on said cover plate and communicating with said closed chamber through said cover plate;
   (d) a unitary siphon unloading pipe of predetermined outside diameter having its upper end mounted in said cover plate and means closing said pipe upper end, said siphon pipe extending downwardly through said closed chamber and continuing through said hole in said top surface and into the inside of said closed tank, the lower end of said siphon pipe terminating adjacent the bottom of said closed tank;
   (e) said hole having a predetermined diameter slightly larger than said outside diameter of said siphon pipe so as to define an annular surge pressure transmitting opening around said siphon pipe for dissipating transient surge pressure of said tank into said closed surge chamber without causing premature rupture of said frangible element, and
   (f) said liquid commodity being unloaded from said tank through said siphon pipe by opening said means closing the upper end of said siphon pipe and connecting said source of pressurized air to said pressure inlet fitting.

* * * * *